US012773636B2

(12) United States Patent
Liu et al.

(10) Patent No.: US 12,773,636 B2
(45) Date of Patent: Oct. 27, 2026

(54) PERFORMING RENDERING PROCESSING BY A GRAPHICS PROCESSING UNIT AND A CENTRAL PROCESSING UNIT

(71) Applicant: Tencent Technology (Shenzhen) Company Limited, Shenzhen (CN)

(72) Inventors: Jingyang Liu, Shenzhen (CN); Yandong Yang, Shenzhen (CN); Xinda Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 237 days.

(21) Appl. No.: 18/587,625

(22) Filed: Feb. 26, 2024

(65) Prior Publication Data

US 2024/0189720 A1 Jun. 13, 2024

Related U.S. Application Data

(63) Continuation of application No. PCT/CN2023/118545, filed on Sep. 13, 2023.

(30) Foreign Application Priority Data

Oct. 21, 2022 (CN) ......................... 202211293540.4

(51) Int. Cl.
*A63F 13/77* (2014.01)
*G06T 1/20* (2006.01)

(52) U.S. Cl.
CPC ................ *A63F 13/77* (2014.09); *G06T 1/20* (2013.01)

(58) Field of Classification Search
CPC .................................. A63F 13/77; G06T 1/20
See application file for complete search history.

(56) References Cited

U.S. PATENT DOCUMENTS

2016/0012618 A1* 1/2016 James ................... G06T 11/203
345/442

FOREIGN PATENT DOCUMENTS

CN 111754381 A 10/2020
CN 115350479 A 11/2022

OTHER PUBLICATIONS

International Search Report and Written Opinion received for PCT Patent Application No. PCT/CN2023/118545, mailed on Nov. 23, 2023, 14 pages (7 pages of English Translation and 7 pages of Original document).

* cited by examiner

*Primary Examiner* — Ke Xiao
(74) *Attorney, Agent, or Firm* — ARENTFOX SCHIFF LLP

(57) ABSTRACT

A rendering processing method includes determining, in a process of rendering a virtual scene, image data required by a graphics processing unit to perform the rendering the virtual scene, configuring a rendering function in a central processing unit according to the required image data, and performing rendering computing through the configured rendering function in the central processing unit according to the required image data, to obtain a computing result. The method further includes outputting the computing result to the graphics processing unit, the computing result being configured for use by the graphics processing unit during the rendering the virtual scene.

20 Claims, 5 Drawing Sheets

PERFORMING RENDERING PROCESSING BY A GRAPHICS PROCESSING UNIT AND A CENTRAL PROCESSING UNIT

RELATED APPLICATIONS

This application is a continuation of International Application No. PCT/CN2023/118545, filed on Sep. 13, 2023, which claims priority to Chinese Patent Application No. 202211293540.4, entitled "RENDERING PROCESSING METHOD AND APPARATUS, ELECTRONIC DEVICE, COMPUTER-READABLE STORAGE MEDIUM, AND COMPUTER PROGRAM PRODUCT" filed on Oct. 21, 2022. The disclosures of the prior applications are hereby incorporated by reference in their entirety.

FIELD OF THE TECHNOLOGY

This disclosure relates to the field of computer technologies, including a rendering processing method and apparatus, an electronic device, a computer-readable storage medium, and a computer program product.

BACKGROUND OF THE DISCLOSURE

With rapid development of computer technologies, various types of application programs are emerging. For example, application programs of a game type may include a cloud game in which game rendering and computing are both performed on a cloud server.

A computer device mainly relies on a graphics processing unit (GPU) and a central processing unit (CPU) deployed in the device, to implement game picture rendering for a game application program. It has been found through practice that, in a running process of a game, an occupancy rate of resources of the graphics processing unit occupied by game rendering is often higher than an occupancy rate of resources of the central processing unit. For example, when the resources of the graphics processing unit are insufficient, the central processing unit is often relatively idle. As a result, the graphics processing unit is under greater running pressure, which may reduce running efficiency of the game.

SUMMARY

Aspects of this disclosure provide a rendering processing method and apparatus, a device, and a medium, which can reduce running pressure of a graphics processing unit, thereby improving running efficiency of a virtual scenario.

In an aspect, a rendering processing method includes determining, in a process of rendering a virtual scene, image data required by a graphics processing unit to perform the rendering the virtual scene, configuring a rendering function in a central processing unit according to the required image data, and performing rendering computing through the configured rendering function in the central processing unit according to the required image data, to obtain a computing result. The method further includes outputting the computing result to the graphics processing unit, the computing result being configured for use by the graphics processing unit during the rendering the virtual scene.

In an aspect, a rendering processing apparatus includes processing circuitry configured to determine, in a process of rendering a virtual scene, image data required by a graphics processing unit to perform the rendering the virtual scene, configure a rendering function in a central processing unit according to the required image data, and perform rendering computing through the configured rendering function in the central processing unit according to the required image data, to obtain a computing result. The processing circuitry is further configured to output the computing result to the graphics processing unit, the computing result being configured for use by the graphics processing unit during the rendering the virtual scene.

In the aspects of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario.

DETAILED DESCRIPTION

Figure 1:
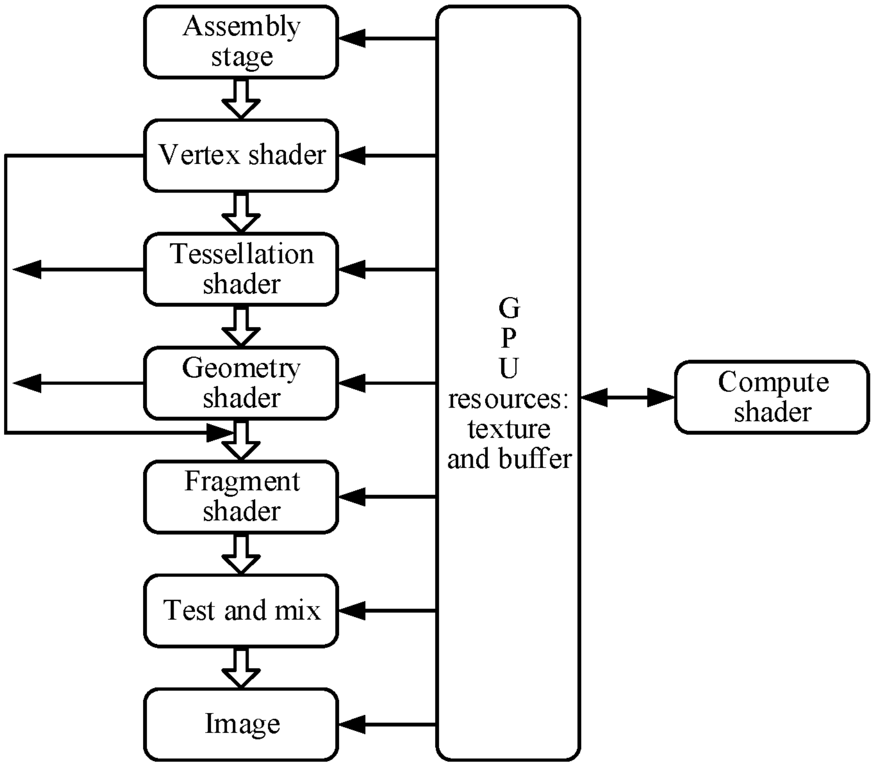
FIG. 1 is a schematic diagram of a rendering procedure according to an exemplary aspect of this disclosure.

The technical solutions in the aspects of this disclosure are clearly and completely described below with reference to the accompanying drawings in the aspects of this disclosure. The described aspects are merely some rather than all of the aspects of this disclosure. All other aspects obtained by a person of ordinary skill in the art based on the aspects of this disclosure shall fall within the protection scope of this disclosure.

The aspects of this disclosure relate to computer graphics (CG). The CG is a science field of using a mathematical algorithm to convert a two-dimensional or three-dimensional image into a raster form for a computer monitor; and may be principles and algorithms related to studying how to represent an image in a computer and performing image computing, processing, and display by using the computer. An important tool involved in the CG is a rendering technology. The rendering is a process of converting an abstract model in the computer into an intuitively visible image. As a last tool in the CG, the rendering can convert a model into an image and finally present the image on a computer screen. The foregoing model may be a three-dimensional object or a virtual scenario that is strictly defined with a language or a data structure, which can include but is not limited to: geometry (such as an object shape), a viewpoint (namely, an optical center of a camera in the image), textures (such as uneven grooves or patterns presented on a physical surface), lighting (such as a shadow effect in the image achieved through light), and other information.

With continuous development of the CG, application of the rendering technology is becoming more and more widespread. For example, when a target application program is run in a computer device (such as a smart terminal or a smart computer), a service page provided by the application program is often required to be rendered and displayed on a display screen, so that the target object (such as any object holding the computer device) can intuitively obtain content displayed on the service page. The target application program herein may be a computer program for completing one or more specified works; may be divided into a game-type application program, a text-type application program, or a communication-type application program, or the like according to a function of the target application program; and may be divided into a client, a mini program, a webpage application, or the like according to a running manner of the target application program. A type of the target application program is not limited in the aspects of this disclosure. For convenience of description, an example in which the target application program is the game-type application program (which may be referred to as a game application program) and an image to be rendered and displayed is a game picture of a virtual scenario (such as any game) provided by the game application program is subsequently used for description.

In actual applications, a computer device mainly relies on a "central processing unit (CPU)" and a "graphics processing unit (GPU)" deployed in the device, to implement rendering and display of the image (or a page, a picture (such as a game picture), or the like). A procedure in which the computer device relies on the central processing unit and the graphics processing unit to perform rendering processing may at least include: an application stage-a geometry stage-a rasterizer stage. (1) The application stage is dominated by the central processing unit, and is a stage in which developers develop scenarios. In the application stage, a camera in the image, light, and the like may be set, to form data (or information) such as points, lines, surfaces, and textures required to render the image. After the data required to render the image is obtained in the application stage, the data may be transferred from the central processing unit to the graphics processing unit, and the graphics processing unit executes the geometry stage based on the data.

(2) The geometry stage is dominated by the graphics processing unit. In the geometry stage, the graphics processing unit may further process the data sent by the central processing unit from the application stage. As shown in FIG. 1, the graphics processing unit includes a rendering pipeline. The rendering pipeline is a set of channels responsible for coloring an image in the graphics processing unit. The rendering pipeline may be divided into a plurality of stages. Each stage uses an output of a previous stage as an input of a current stage, so that the rendering pipeline works like an assembly line. Due to a parallel execution characteristic of each stage in the rendering pipeline, a small processor in a graphics card (a device including the graphics processing unit) can run an own mini program for each stage on the graphics processing unit, thereby quickly processing the data in the rendering pipeline. Such mini programs may be referred to as shaders, and different shaders can implement different functions. The rendering pipeline shown in FIG. 1 includes a vertex shader, a geometry shader, and the like. An input of a current shader is an output of a previous shader. A mini program (namely, a shader) run on the graphics card is provided by DirecteXtension (DirectX). DirectX is an application program interface, may be used as a rendering interface (application programming interface, API) in Windows (an operating system), and may include but is not limited to: DirectX9, DirectX10, DirectX11, or DirectX12. Different DirectX corresponds to different dynamic-link library (DLL) files.

The graphics processing unit further includes a separate pipeline independent of the rendering pipeline, and the separate pipeline includes a compute shader. The compute shader is general computing logic run in the graphics processing unit, and may perform a read-write operation on any stage of the rendering pipeline in the rendering procedure, to execute a relatively pure rendering computing task. After the graphics processing unit has computing power of the compute shader, the graphics processing unit does not perform "simulation" computing in rasterization, but has professional-level computing power, thereby having a faster computing speed and more flexible computing power.

(3) The rasterizer stage is also dominated by the graphics processing unit. In this stage, data transmitted from a previous stage (namely, the geometry stage) may be received, and pixels are generated and a final image (or picture) is obtained by rendering based on the received data. A main task of the rasterizer stage is to determine which pixels in each rendering primitive (namely, an element in the image) are to be drawn on the display screen, to render and display data or information as an image on a terminal screen.

Through the rendering procedure described above, it is not difficult to find that, the graphics processing unit takes on massive mathematical computing of image rendering in the entire rendering procedure, but the central processing unit only takes on data preparation in the application stage in the entire rendering procedure. Therefore, in many image rendering scenarios, an occupancy rate (or a usage rate or a load rate) of the graphics processing unit is often higher than an occupancy rate of the central processing unit. The occupancy rate of the graphics processing unit may be a ratio of a used resource (such as memory space) of the graphics processing unit to a total resource. Similarly, the occupancy rate of the central processing unit may be a ratio of a used resource of the central processing unit to a total resource. As a result, resource usage between the graphics processing unit and the central processing unit is uneven. For example, when resources of the graphics processing unit are insufficient, the central processing unit may be in a relatively idle state. Based on this, the aspects of this disclosure provide a rendering processing solution. In this solution, a part of works for which a graphics processing unit is responsible are transferred to a central processing unit, and the central processing unit replaces the graphics processing unit to execute the part of works. By transferring a part of computing power, the central processing unit takes on a part of works of the graphics processing unit, to reduce running pressure of the graphics processing unit to a certain extent, thereby making image rendering have better performance.

In actual implementation, it can be seen from the rendering procedure described above that, because a compute shader is responsible for a relatively pure computing task in the rendering procedure, the computing task may be started or stopped at any time when a virtual scenario is run, without affecting running logic of the virtual scenario. Therefore, in the aspects of this disclosure, a rendering pipeline including the graphics processing unit is split into two parts: a compute shader and a normal pipeline (for example, a vertex shader or a geometry shader). Then, computing power of the compute shader in the graphics processing unit is transferred to the central processing unit, in other words, the compute shader split from the graphics processing unit may consume a resource of the central processing unit to execute the computing task. After the central processing unit completes computing of the compute shader, a computing result is returned to the graphics processing unit. After the computing result is copied to the graphics processing unit, that is, copied to a graphics processing unit pipeline, the graphics processing unit obtains an expected result like execution of the compute shader has been completed in the graphics processing unit, so that the graphics processing unit can use the computing result during rendering the virtual scenario.

A main principle of the rendering processing solution provided in the aspects of this disclosure may include: In a process in which the graphics processing unit renders the virtual scenario, when it is detected that a load rate of the graphics processing unit is large and a load rate of the central processing unit is small, it is determined that computing migration may be started. In this case, invoking related to the compute shader of the virtual scenario may be truncated, and a target resource required by the graphics processing unit to perform resource computing during rendering the virtual scenario may be determined. The target resource may include resources required by any shader or another apparatus in the graphics processing unit to perform resource computing, and may include resources (for example, a texture resource, a geometry resource, and a vertex resource) required by the compute shader in the graphics processing unit to perform resource computing. Then, computing configuration is performed on the central processing unit according to the target resource, for example, a rendering device configured to perform computing of the compute shader is created in the central processing unit. Then, a related resource (for example, the target resource) of the compute shader is transferred to the rendering device created in the central processing unit; and by using a running characteristic of the rendering device in the central processing unit, a rendering work is transferred from the graphics processing unit to the central processing unit, in other words, computing is performed on the target resource through the configured central processing unit, to obtain a computing result. Finally, after rendering of the compute shader of the rendering device is completed, the computing result is required to be synchronized to the graphics processing unit, to ensure consistency of data, so that the graphics processing unit uses the computing result during rendering the virtual scenario.

In this aspect of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario.

The aspects of this disclosure are described by using an example of migrating computing power of the compute shader in the graphics processing unit. However, in an actual scenario, if the graphics processing unit further includes another computing power that can be migrated, the another computing power may also be migrated. This is not limited in the aspects of this disclosure.

The rendering processing solution provided in the aspects of this disclosure is applicable to a plurality of different application scenarios. Application scenarios are different according to different running manners of virtual scenarios. The virtual scenarios may be classified according to different running manners, and may include a virtual game scenario (virtual game scene), for example, a local game (or referred to as a client game) and a cloud game, a virtual shopping scenario (virtual shopping scene), or an audio and video application scenario (i.e., an audiovisual application scene).

In actual applications, regardless of whether the virtual scenario is the virtual game scenario, the virtual shopping scenario, or the audio and video application scenario, for a target object, the virtual scenario can be pulled up from local software as long as the local software integrated with the rendering processing solution is deployed in a terminal device held by the target object; and the virtual scenario automatically determines whether computing migration of the compute shader from the graphics processing unit to the central processing unit needs to be started, that is, whether to execute a computing migration solution provided in the aspects of this disclosure. Information such as overall execution logic and a database of the rendering processing solution is integrated in the local software. In addition, there is no network traffic requirement to start and run the local software. The target object may use the computing migration provided by the local software at any time when needed, thereby improving universality of the rendering processing solution to a certain extent.

By using an example in which the virtual scenario is a virtual game scenario, for example, a local game and a cloud game, the game application scenario involved in the aspects of this disclosure is exemplarily introduced below.

(1) The local game may be a game that is downloaded to a terminal device by downloading a game installation package and run locally on the terminal device. A game picture rendering process of the local game is performed by a computer device. In other words, the computer device is not only responsible for rendering a game picture of the local game, but also responsible for displaying the game picture of the local game. In a game application scenario in which the virtual scenario is the local game, the foregoing computer device executing the rendering processing solution may include a terminal device that performs interaction with a target object (such as a game player). The terminal device may include but is not limited to a smart terminal carrying a display screen, such as a smartphone (such as a smartphone deployed with an Android system, or a smartphone deployed with an Internetworking operating system (IOS)), a tablet computer, a portable personal computer, a mobile Internet device (MID), a smart TV, an in-vehicle device, or a headset.

Figure 2A:
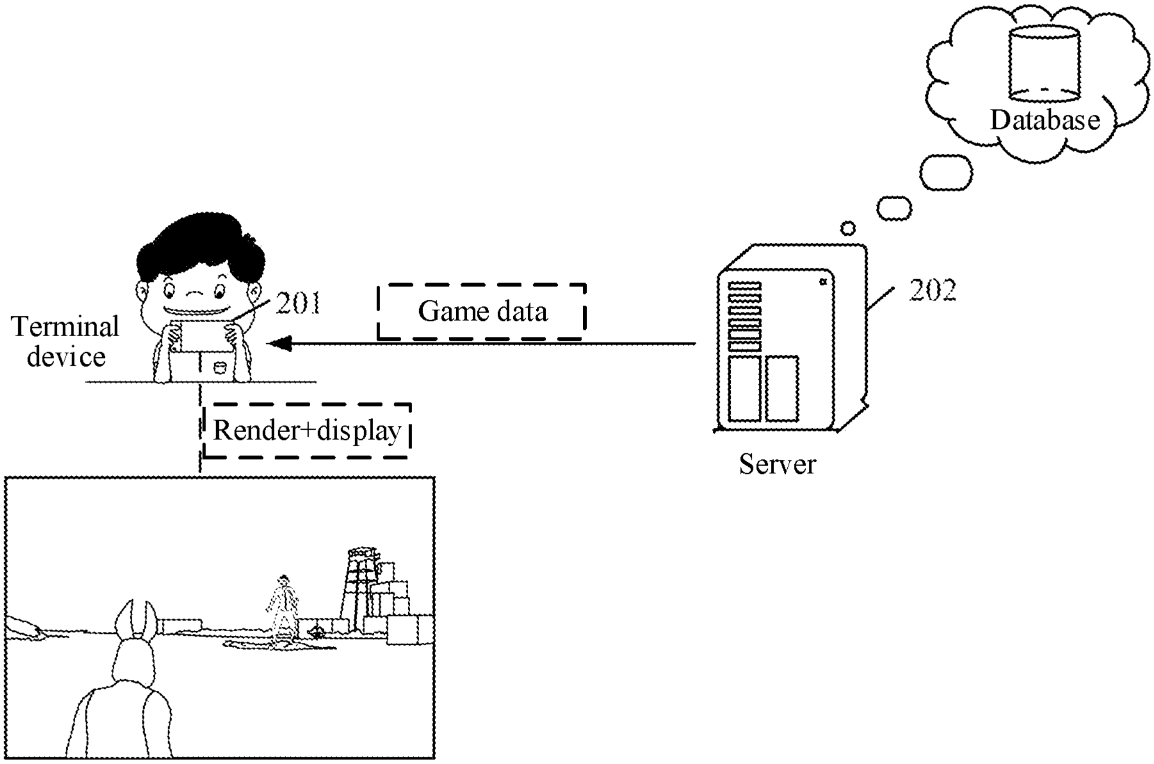
FIG. 2A is a schematic diagram of a game scenario of a client game according to an exemplary aspect of this disclosure.

As shown in FIG. 2A, in a scenario in which the virtual scenario is a local game deployed in a terminal device 201, the terminal device 201 performs data interaction with a server 202 corresponding to the virtual scenario deployed in the terminal device, to implement running of the virtual scenario. For example, the terminal device 201 receives game data sent by the server 202, and the terminal device 201 renders and displays a game picture based on the received game data. The server in the game application scenario may include but is not limited to a device with complex computing power, such as a data processing server, a world wide web (Web) server, or an application server. Alternatively, the server may be an independent physical server, or may be a server cluster including a plurality of physical servers or a distributed system.

In the game application scenario in which the virtual scenario is the local game (for example, in a mode in which a client independently runs a virtual game scenario), through the computing migration process provided in the aspects of this disclosure, forming of computing resources can be adjusted without reducing a computing amount of resource computing, and the compute shader can be split from the rendering pipeline of the graphics processing unit to use the central processing unit to perform computing. In this way, a requirement for hardware configuration of the computer device (namely, the terminal device) is reduced, and a virtual game scenario with higher rendering quality can be run by using a graphics card with lower configuration. In this way, a running speed of a large game in the terminal device can be improved to a certain extent, so that the virtual game scenario has a better running effect.

Figure 2B:
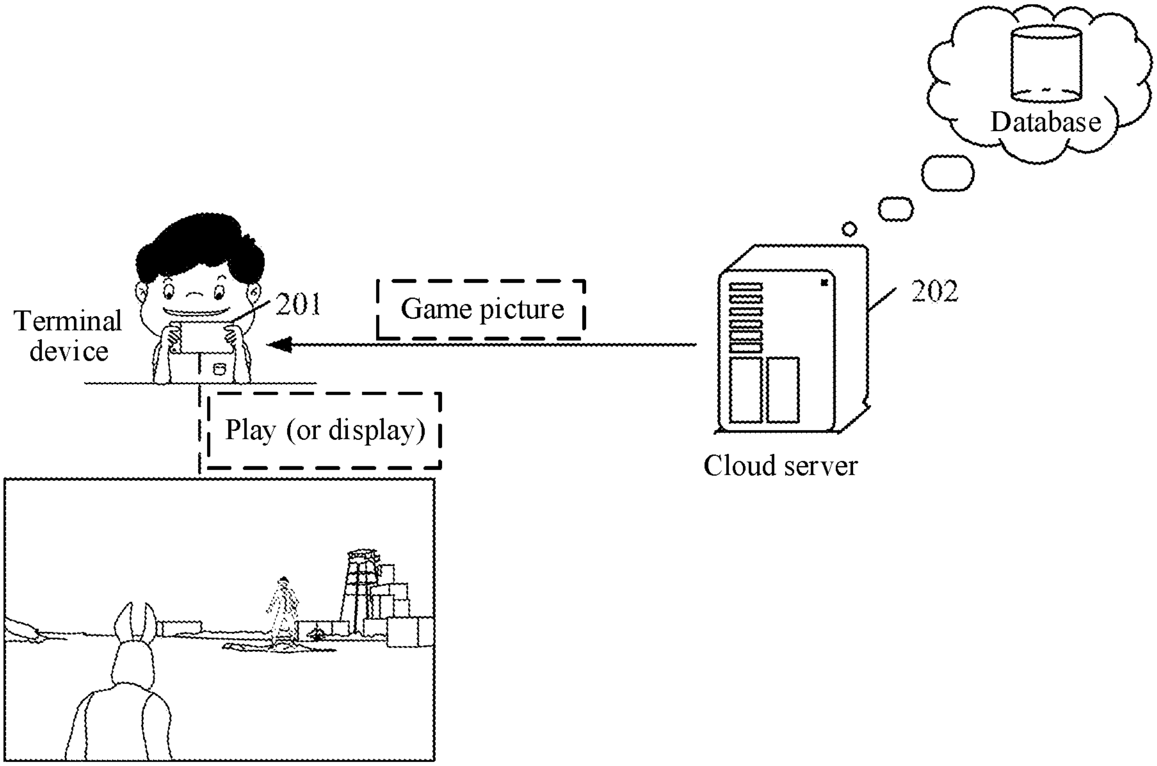
FIG. 2B is a schematic diagram of a game scenario of a cloud game according to an exemplary aspect of this disclosure.

(2) The cloud game may also be referred to as gaming on demand, and is a game run in a computer device. In this case, the computer device includes a cloud server. As shown in FIG. 2B, in a game application scenario in which the virtual scenario is the cloud game, the virtual scenario may send data (such as an input instruction or signal) sent by a peripheral device to the cloud server. A cloud game server is responsible for rendering a game picture according to the data, and compressing and transmitting a rendered game picture to a terminal device used by an operation object through a network. In this case, the terminal device only performs an operation of displaying the game picture.

By using such a running mode of the cloud game, a terminal device held by a game player does not need to have powerful graphics computing and data processing capabilities, but only needs to have a basic streaming media playback capability (such as a capability of displaying game pictures), a human-computer interaction capability (a capability of obtaining an input operation of the operation object), and a data transmission capability (such as a capability of sending instructions to the cloud server).

In the game application scenario in which the virtual scenario is the cloud game (namely, a cloud game mode based on server-side computing), the rendering processing solution provided in the aspects of this disclosure has prominent advantages over related cloud game rendering. In a related cloud game mode, a central processing unit and a graphics processing unit for running a cloud game are properly configured, and computing power of the two exactly matches the cloud game. If the model for configuring the central processing unit and the graphics processing unit is updated or modified during running of the cloud game, for example, if occupancy of the graphics processing unit suddenly increases significantly, the quantity of cloud games that a cloud server running the cloud game can run decreases, and a large number of resources of the central processing unit of the cloud server are wasted. However, through the rendering processing solution (namely, the computing migration solution) provided in the aspects of this disclosure, distribution of computing power of the central processing unit and the graphics processing unit can be dynamically adjusted in a specific hardware environment, and resources of the central processing unit of same hardware are not greatly wasted, but are used to provide a part of computing power of the graphics processing unit. This allows for a more flexible hardware configuration of the server, enabling the server to run a larger quantity of cloud games at the same time and reducing hardware costs. In addition, the same hardware configuration can support a variety of game computing needs with different needs, thereby improving adaptability of a hardware solution. For example, one hardware solution can be used in more game scenarios, thereby improving the life of the hardware solution.

The following two points also need to be described in the aspects of this disclosure: (1) An actual type of a virtual game scenario run in a terminal device is not limited in the aspects of this disclosure. For example, the virtual game scenario may be a local game. In this case, a computer device executing the rendering processing solution is a terminal device held by a target object, in other words, the terminal device executes the rendering processing solution, and the central processing unit and the graphics processing unit described above are apparatuses deployed in the terminal device. Similarly, for example, the virtual game scenario may be a cloud game. In this case, a computer device executing the rendering processing solution is a cloud server, in other words, the cloud server executes the rendering processing solution, and the central processing unit and the graphics processing unit described above are apparatuses deployed in the cloud server. (2) When the aspects of this disclosure are applied to actual game products or technologies, for example, when a target application program obtains game data when a target object operates a virtual game scenario, permission or consent of the target object is required to be obtained. In addition, collection, use, and processing of relevant data need to comply with relevant laws, regulations, and standards of relevant regions. For example, a game equipment provided by the target application program needs to comply with relevant laws, regulations, and standards of relevant regions. (3) In the aspects of this disclosure, an example in which an application scenario of the rendering processing solution is a game application scenario is used for description. However, in actual applications, the application scenario of the rendering processing solution provided in the aspects of this disclosure is not limited to the game application scenario. For example, the rendering processing solution provided in the aspects of this disclosure further supports an audio and video application scenario. For example, in a live streaming application scenario, resource computing of a graphics processing unit for rendering a live streaming picture may be transferred to a central processing unit, and the central processing unit replaces the graphics processing unit to perform resource computing, so that a live streaming device can also obtain a live streaming picture with higher quality by using a graphics card with lower configuration, thereby improving live streaming experience. Alternatively, the rendering processing solution provided in the aspects of this disclosure further supports a network shopping application scenario. For example, in a network shopping application scenario, resource computing of a graphics processing unit for rendering a shopping picture may be transferred to a central processing unit, and the central processing unit replaces the graphics processing unit to perform resource computing, so that a network shopping device can also obtain a shopping picture with higher quality by using a graphics card with lower configuration, thereby improving shopping experience of a user.

Figure 3:
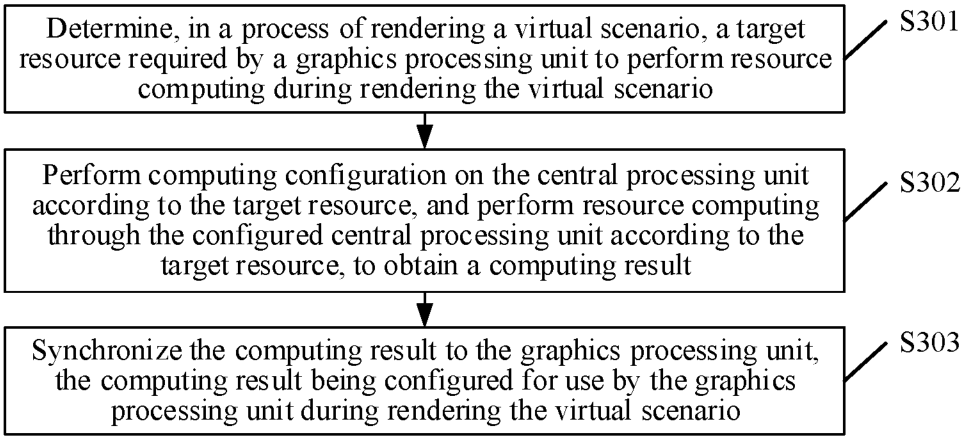
FIG. 3 is a schematic flowchart of a rendering processing method according to an exemplary aspect of this disclosure.

Based on the rendering processing solution described above, an aspect of this disclosure provides a more detailed rendering processing method. The rendering processing method provided in this aspect of this disclosure is described in detail with reference to the accompanying drawings. FIG. 3 is a schematic flowchart of a rendering processing method according to an exemplary aspect of this disclosure. The rendering processing method may be performed by the computer device described above, and the method may include step S301 to step S303.

S301: Determine, in a process of rendering a virtual scenario, a target resource required by a graphics processing unit to perform resource computing during rendering the virtual scenario. For example, in a process of rendering a virtual scene, image data required by a graphics processing unit to perform the rendering the virtual scene is determined.

The target resource may be resources required by a rendering pipeline during rendering the virtual scenario, including but not limited to: a texture, a mesh model, a shader constant (such as an incident light direction or an incident light color), a frame buffer, and the like. As described above, in this aspect of this disclosure, a part of computing power of the graphics processing unit is mainly migrated to a central processing unit, and the central processing unit replaces the graphics processing unit to take on the migrated part of computing power. In this case, according to different to-be-migrated computing power, a target resource required to be migrated is also different. Considering that a compute shader is responsible for a relatively pure computing task in the rendering procedure, the computing task may be started or stopped at any time when the virtual scenario is run, without affecting running logic of the virtual scenario. Therefore, in this aspect of this disclosure, an example in which to-be-migrated computing power is computing power of the compute shader is used, in other words, the compute shader consumes the central processing unit to perform resource computing. In this implementation, the target resource may include resources required by the compute shader in the graphics processing unit to perform resource computing when the graphics processing unit renders the virtual scenario, which may include resources of types such as a buffer (such as a vertex, an index, and a constant) or a texture.

To move the computing power directly from the graphics processing unit to the central processing unit, invoking of the virtual scenario related to the compute shader needs to be truncated after computing migration is started, to avoid an operation of continuing to perform resource computing through the compute shader in the graphics processing unit. The invoking related to the compute shader may be invoking of a condition required by the compute shader to perform resource computing, including but not limited to resource preparation (preparing resources for the compute shader to perform resource computing), pipeline allocation (such as setting up the compute shader), distribution (such as performing computing), and the like. In this aspect of this disclosure, a dynamic-link library (DLL) file replacement manner is supported, to implement the operation of truncating the invoking of the virtual scenario related to the compute shader. The DLL file is a dynamic-link library file, also referred to as application program extension, belonging to a software file type. In Windows, many application programs are not complete executable files, but are divided into some independent DLL files and placed in the system. When a program is executed, a corresponding DLL file is invoked. In other words, a DLL file is an executable file that allows a program to share code and other resources necessary to perform a special task. In other words, a DLL file includes many functions and resources that allow a Windows-based program to perform an operation in a Windows environment.

Based on the introduction related to the dynamic-link library file, an implementation process of truncating the invoking of the virtual scenario related to the compute shader by using dynamic-link library file replacement may include the following steps:

First, a second dynamic-link library file provided in this aspect of this disclosure is obtained, where the second dynamic-link library file indicates to perform resource computing through the central processing unit during rendering the virtual scenario. In other words, the second dynamic-link library file includes related code required to perform resource computing through the central processing unit. By running the related code, resource computing for the target resource that consumes resources of the central processing unit can be implemented. The second dynamic-link library file may be pre-written by a development object and stored in local software. When the invoking of the virtual scenario related to the compute shader needs to be truncated by using the dynamic-link library file replacement, the virtual scenario may obtain the second dynamic-link library file from the local software. For introduction related to the local software, refer to the foregoing related description. Details are not described herein.

Then, the second dynamic-link library file is used to replace a native dynamic-link library file (which may be referred to as a first dynamic-link library file in this aspect of this disclosure) in the graphics processing unit, where the first dynamic-link library file indicates to perform resource computing through the graphics processing unit during rendering the virtual scenario, the first dynamic-link library file includes a target function, and the first dynamic-link library file may invoke the target function to obtain the target resource required by the graphics processing unit to perform resource computing during rendering the virtual scenario. In other words, in this aspect of this disclosure, by replacing the first dynamic-link library file required to be loaded during running the virtual scenario with the second dynamic-link library file, function invoking of the first dynamic-link library file for the target function can be truncated, and the second dynamic-link library file after the replacement implements function invoking for the target function. In other words, the function invoking of the first dynamic-link library file for the target function is replaced with the function invoking of the second dynamic-link library file for the target function. In this way, the second dynamic-link library file after the replacement can invoke the function to perform subsequent processing. For example, the graphics processing unit invokes the target function through the second dynamic-link library file, to obtain the target resource required by the graphics processing unit to perform resource computing during rendering the virtual scenario, thereby implementing an operation of truncating the graphics processing unit to invoke the target function through the native dynamic-link library file to perform resource computing.

Finally, the second dynamic-link library file is invoked through the graphics processing unit, to determine the target resource required by the graphics processing unit to perform resource computing during rendering the virtual scenario. When the second dynamic-link library file invokes the target function, the target resource (for example, a texture resource and a vertex resource) required by the graphics processing unit to perform resource computing during rendering the virtual scenario may be obtained.

Through the implementation process of the dynamic-link library file replacement described above, function invoking of the native dynamic-link library file can be truncated in the graphics processing unit, and truncated content is processed by the second dynamic-link library file provided in this aspect of this disclosure, for example, the second dynamic-link library file executes function invoking, so that logic of originally consuming the graphics processing unit to perform related computing of the compute shader is migrated to the central processing unit, in other words, related computing of the compute shader is performed by consuming the central processing unit. Through the dynamic-link library file replacement manner, invoking of the virtual scenario related to the compute shader can be quickly truncated, and the operation is simple and fast.

S302: Perform computing configuration on the central processing unit according to the target resource, and perform resource computing through the configured central processing unit according to the target resource, to obtain a computing result. For example, a rendering function is configured in a central processing unit according to the required image data, and rendering computing is performed through the configured rendering function in the central processing unit according to the required image data, to obtain a computing result.

It can be known from the foregoing description that, in this aspect of this disclosure, the part of computing power of the graphics processing unit is supported to be migrated to the central processing unit, for example, the compute shader split from the rendering pipeline of the graphics processing unit can consume the central processing unit to perform computing. In this case, a rendering device needs to be created in the central processing unit, so that the rendering device created in the central processing unit takes on resource computing related to the compute shader. The rendering device is a device having a complete rendering function. The rendering device provided in this aspect of this disclosure may include a graphics transform apparatus (warp device or graphics transform function). The warp device is an efficient central processing unit rendering device that may simulate a DirectX characteristic to perform rendering processing; and may be a DirectX pipeline that uses the central processing unit to render, thereby realizing a complete game rendering requirement using the central processing unit to render. Certainly, in actual applications, a type of the rendering device created in the central processing unit may change. This is not limited in the aspects of this disclosure.

In actual applications, a graphics transform apparatus performing rendering computing by using the central processing unit is created in the central processing unit, where the graphics transform apparatus includes context (or referred to as device context), which may record a pipeline state (for example, binding a new resource, binding a new shader, and modifying fixed function stage setting) of the rendering pipeline in the graphics transform apparatus. Then, the target resource required by the graphics processing unit to perform resource computing during rendering the virtual scenario is configured in the graphics transform apparatus in the central processing unit, that is, configured in the context of the graphics transform apparatus, to implement computing configuration performed on the central processing unit according to the target resource.

During actual implementation, after computing configuration performed on the central processing unit is completed, resource computing is performed through the configured central processing unit according to the target resource, that is, resource computing is performed through the graphics transform apparatus configured in the central processing unit according to the target resource, to obtain the computing result. According to a different type of the target resource, a computing process performed on the target resource is also different. For example, if the target resource includes a texture resource, computing performed on the texture resource may include texture blur computing. An implementation process of computing for the target resource is not limited in the aspects of this disclosure.

Figure 4:
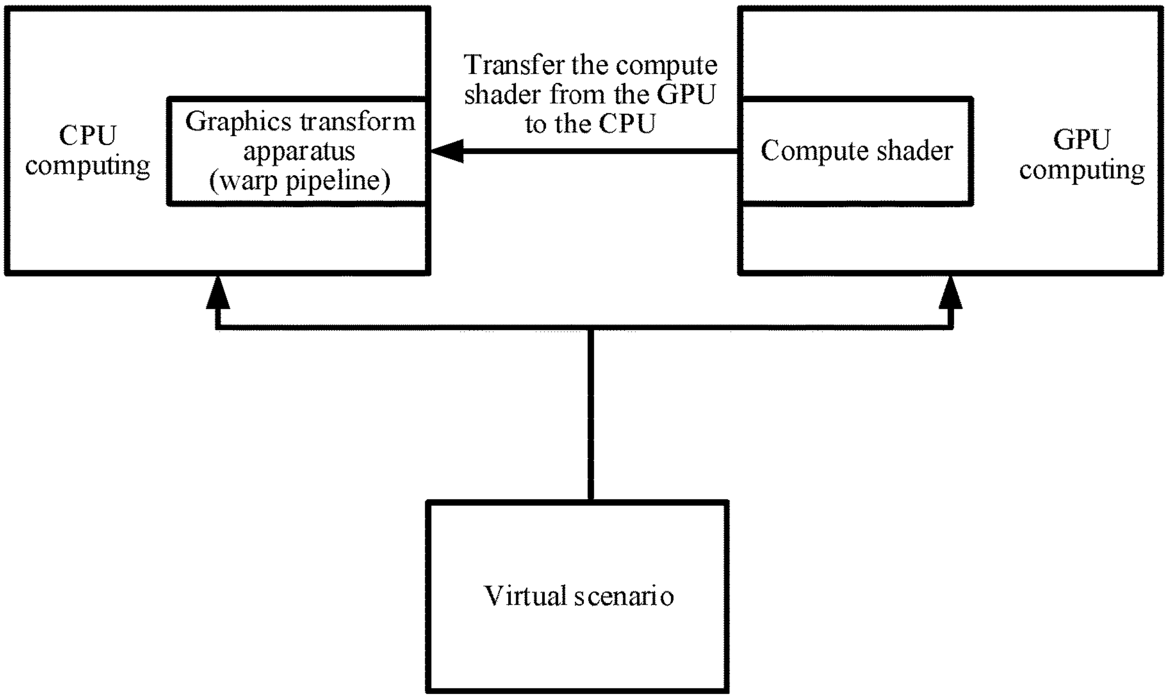
FIG. 4 is a schematic flowchart of performing computing configuration on a central processing unit according to a target resource according to an exemplary aspect of this disclosure.

For a schematic flowchart of performing computing configuration on the central processing unit according to the target resource, refer to FIG. 4. As shown in FIG. 4, a virtual scenario run in a computer device relies on a central processing unit and a graphics processing unit deployed in the computer device for picture rendering display. In a process in which the graphics processing unit renders the virtual scenario, if computing migration is determined to be started (that is, computing power is transferred from the graphics processing unit to the central processing unit), a target resource required by the graphics processing unit to perform resource computing during rendering the virtual scenario may be determined, that is, a target resource related to a compute shader (or the target resource required by the compute shader to perform resource computing) may be determined. Then, a graphics transform apparatus performing rendering computing by using the central processing unit is created in the central processing unit. Finally, the target resource is configured from the graphics processing unit to the central processing unit, that is, the target resource is configured in context of a pipeline of the graphics transform apparatus in the central processing unit, to facilitate the graphics transform apparatus configured with the target resource to replace the graphics processing unit to perform related processing such as resource computing.

A related Windows pipeline supports buffering a computing result of the compute shader as needed. In this way, when a compute shader of DirectX is running asynchronously, separate flushing and block waiting are unnecessary for a computing result of the compute shader, and a corresponding computing result can be obtained from a buffer as needed. Asynchronous computing of the compute shader of DirectX may be simply understood as that computing of the compute shader is mixed in ordinary rendering instructions. For example, when any one or more ordinary rendering instructions are executed, running of the compute shader can be executed. However, in the splitting mode involved in this aspect of this disclosure, that is, in a mode in which the compute shader in the graphics processing unit is split into the central processing unit to perform resource computing, the computing result of the compute shader in the graphics processing unit is expected to be immediately synchronized to the graphics processing unit (which may be a pipeline run in the graphics processing unit). Therefore, in the process in which the graphics processing unit renders the virtual scenario, when it is detected that the compute shader is invoked in the graphics processing unit to distribute resource computing related to the virtual scenario, the resource computing in the graphics processing unit needs to be truncated as that the graphics processing unit invokes the context of the warp device (namely, the graphics transform apparatus) to perform distribution of the compute shader. In this case, flushing and block waiting for the computing result of the compute shader also need to be performed on the warp device, to ensure that the computing result of the compute shader can be obtained in time, so that the computing result of the compute shader in the graphics processing unit is fast synchronized to the graphics processing unit.

S303: Synchronize the computing result to the graphics processing unit, the computing result being configured for use by the graphics processing unit during rendering the virtual scenario. For example, the computing result is output to the graphics processing unit, the computing result being configured for use by the graphics processing unit during the rendering the virtual scene.

Based on the foregoing steps, after computing is performed on the target resource in the central processing unit to obtain the computing result, the computing result is further required to be synchronized to the graphics processing unit, to maintain data consistency between the central processing unit and the graphics processing unit. In this way, the computing result received by the graphics processing unit is similar to a computing result obtained by the graphics processing unit performing resource computing, so that the graphics processing unit can perform subsequent rendering processing based on the computing result.

In a process in which DirectX computes the compute shader, a required target resource may include a resource corresponding to a target resource view, where the target resource view is a view of a type of resources used in a working process of a rendering pipeline. When one resource or one type of resources need to be configured in different stages of the rendering pipeline, for example, a texture resource needs to be configured in a pixel shader and a fragment shader, a resource view needs to be created for the resource. A video memory address of the resource may be saved in the resource view. In this way, by configuring the resource view to the rendering pipeline, a corresponding stage of the rendering pipeline can indirectly access the resource through the resource view (which may be the video memory address of the resource saved in the resource view).

In this aspect of this disclosure, a target resource view associated with the target resource that needs to be copied from the central processing unit to the graphics processing unit may at least include a shader resource view (shader image data) and an unordered access view (unordered access image data). (1) The shader resource view may refer to a buffer or texture resource, to bind to a compute shader stage. The shader resource view is only-read for an execution process of the compute shader, in other words, the graphics transform apparatus has only read permission for the shader resource view, and does not have write permission for the shader resource view. However, it is considered that each time the compute shader is invoked, content (namely, subresources or data included in the resource) of a same resource corresponding to the shader resource view may change. Based on this, in this aspect of this disclosure, a procedure of copying the resource corresponding to the shader resource view from the graphics processing unit to the central processing unit is still designed. Copying costs about copying the resource corresponding to the shader resource view to the central processing unit are acceptable. This is because the compute shader is computationally intensive, in other words, overheads of resource copying are less than those of computing, and costs can be saved to a certain extent. (2) The unordered access view may refer to the buffer or texture resource, to bind to the compute shader stage or a fragment shader stage. The unordered access view is readable and writable for the execution process of the compute shader, in other words, the graphics transform apparatus has read-write permission for the unordered access view, where the read-write permission includes read permission and write permission.

In the process in which DirectX computes the compute shader, the involved target resource view further includes at least one of the following: a sampler view (sampler image data) or a shader view (shader image data). The shader view and the sampler view are only-read for the execution process of the compute shader, in other words, the graphics transform apparatus has only the read permission for the shader resource view, and does not have the write permission for the shader resource view. In addition, a resource corresponding to the sampler view and a resource corresponding to the shader view are fixed small resources (that is, resource capacities (for example, maximum data amounts that resources can carry) are small). In this way, the resource corresponding to the sampler view and the resource corresponding to the shader view can simultaneously exist in the central processing unit and the graphics processing unit, and there is no cost when the resources are simultaneously used in the central processing unit and the graphics processing unit. Therefore, when the resource corresponding to the sampler view and the resource corresponding to the shader view exist in the graphics processing unit, the resource corresponding to the sampler view and the resource corresponding to the shader view may not be copied from the graphics processing unit to the central processing unit. In this implementation, the target resource that needs to be copied from the central processing unit to the graphics processing unit includes the resource corresponding to the shader resource view and a resource corresponding to the unordered access view, which can save resource copying costs to a certain extent.

It can be known based on the related description on the target resource and the target resource view that, in the execution process of the compute shader, in the foregoing four target resource views, three target resource views (the shader resource view, the sampler view, and the shader view) each are only-read, and only one target resource view (the unordered access view) is readable and writable. In this way, in the compute shader, in the foregoing four target resource views, only one or more resources corresponding to the unordered access view may be modified. In other words, after the central processing unit completes execution of the compute shader, a result that needs to be synchronized to the graphics processing unit has only the resource corresponding to the unordered access view. Based on this, after computing is performed on the target resource by using the configured graphics processing unit, the computing result to be synchronized to the pipeline of the graphics processing unit includes a resource result obtained by performing computing on the resource corresponding to the unordered access view. In this case, the resource result obtained by performing computing on the resource corresponding to the unordered access view may be synchronized from the central processing unit to the pipeline of the graphics processing unit. After the resource result is received, the graphics processing unit obtains an expected resource result like execution of the compute shader has been completed in the graphics processing unit, so that the graphics processing unit can use the resource result during rendering the virtual scenario.

In this aspect of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario. In addition, in a manner of moving a part of computing power from the graphics processing unit to the central processing unit, overheads of the graphics processing unit can be reduced by increasing overheads of the central processing unit, so that a graphics card requirement of a terminal device can be reduced in a client virtual scenario, and a proper hardware configuration (namely, a ratio of resources of the central processing unit to resources of the graphics processing unit) of a server can be achieved in a pure server virtual scenario.

Figure 5:
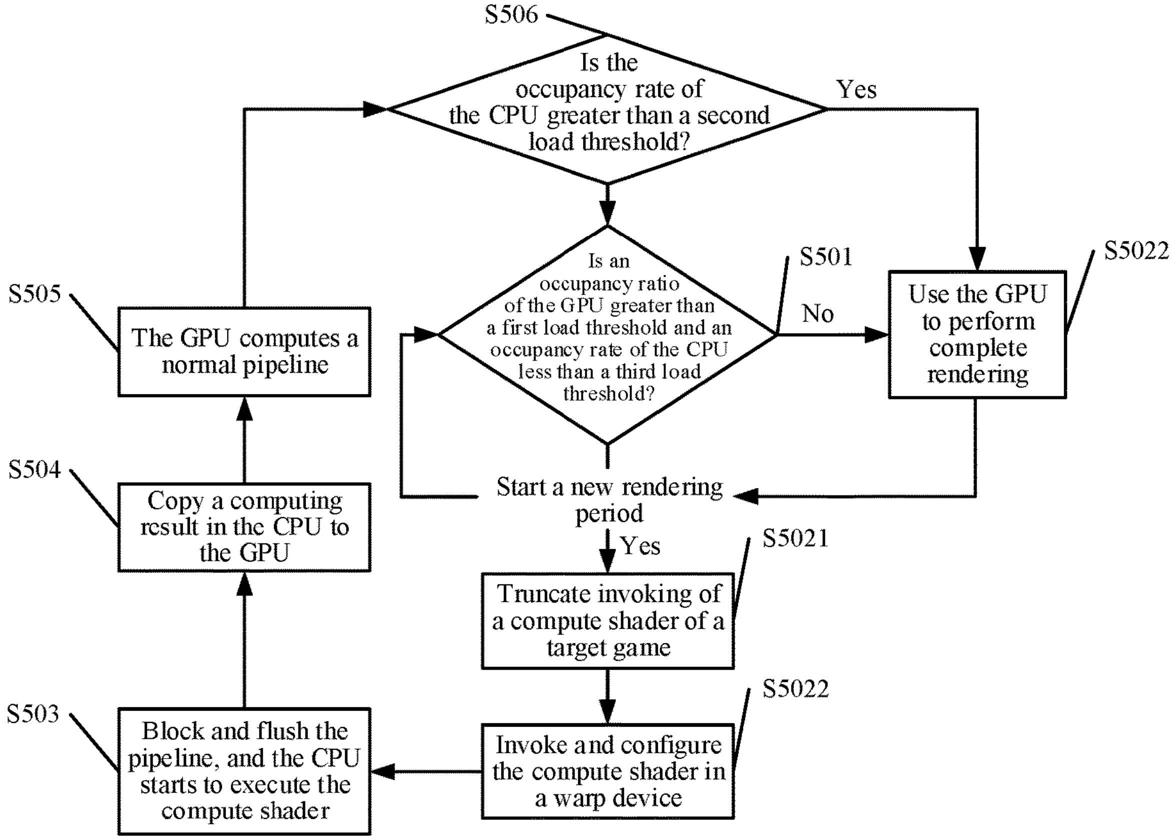
FIG. 5 shows a complete technical procedure of a rendering processing method according to an exemplary aspect of this disclosure.

For a complete technical procedure of a rendering processing method according to aspect of this disclosure, refer to FIG. 5. As shown in FIG. 5, the rendering processing method provided in this aspect of this disclosure is implemented through step 501 to step 506. The step 502 is divided into step 5021 and step 5022, to be specific, in the process in which the computer device runs the virtual scenario, the virtual scenario automatically determines whether computing migration needs to be started, that is, whether computing migration of the compute shader from the graphics processing unit to the central processing unit needs to be started. If it is determined that computing migration does not need to be started, complete virtual scenario rendering is performed according to the graphics processing unit, that is, the graphics processing unit performs resource computing related to the compute shader. If it is determined that computing migration needs to be started, invoking of the virtual scenario for resource preparation, pipeline allocation, and dispatching related to the compute shader is truncated. After the invoking related to the compute shader is truncated, the invoking related to the compute shader is configured in the central processing unit, that is, configured in the warp device in the graphics processing unit. When the central processing unit invokes the context of the warp device to perform resource computing, flushing and block waiting are performed on the warp device, and the configured central processing unit is used to perform computing on the target resource, to obtain the computing result. Then, the computing result is copied from the central processing unit to the graphics processing unit, that is, copied to the pipeline run in the graphics processing unit, to facilitate the graphics processing unit to use the computing result to continue to render the virtual scenario.

Figure 6:
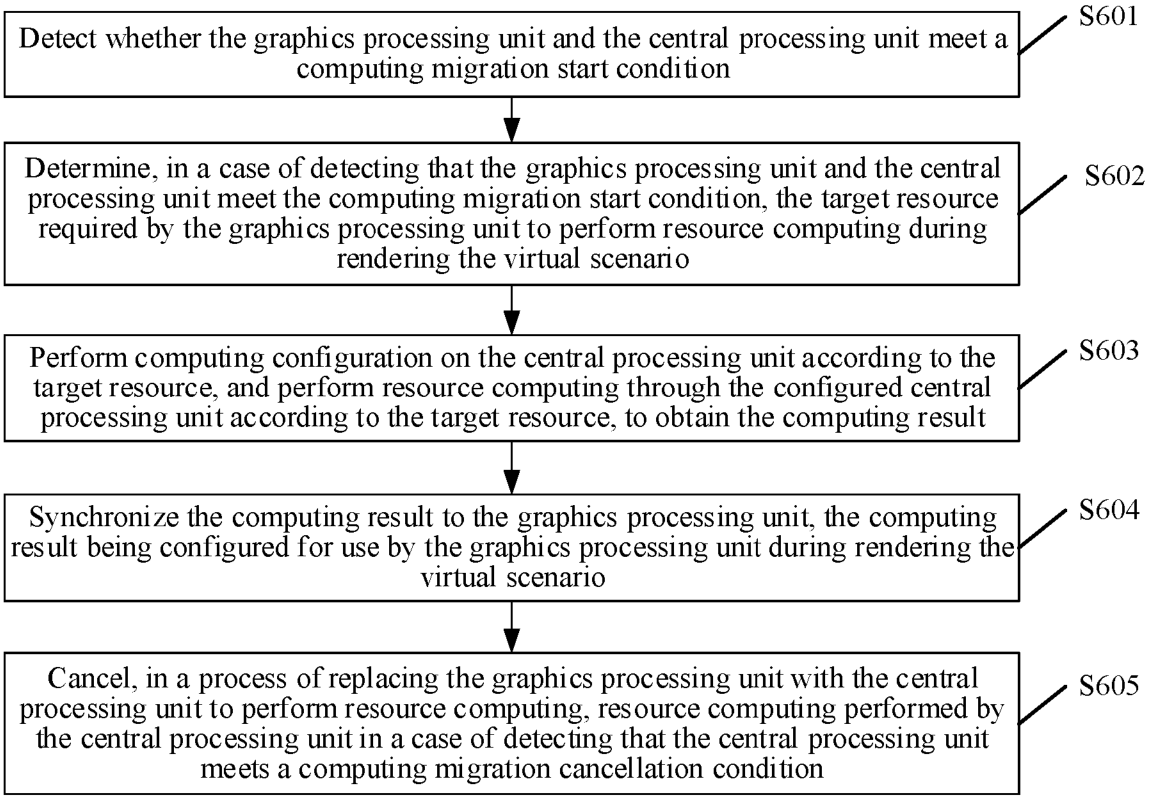
FIG. 6 is another schematic flowchart of a rendering processing method according to an exemplary aspect of this disclosure.

Based on the complete technical procedure of the rendering processing method shown in FIG. 5, the technical procedure shown in FIG. 5 is described below in more detail with reference to FIG. 6. FIG. 6 is a schematic flowchart of a rendering processing method according to an exemplary aspect of this disclosure. The rendering processing method may be performed by the computer device described above, and the method may include step S601 to step S605.

S601: Detect whether the graphics processing unit and the central processing unit meet a computing migration start condition.

As described above, if local software integrated with the rendering processing solution is deployed in a terminal device held by a target object, the target object may pull up the virtual scenario through the local software; and in a process of running the virtual scenario, the virtual scenario may invoke a library included in the local software, to automatically determine whether computing migration of the compute shader from the graphics processing unit to the central processing unit needs to be started. The virtual scenario automatically invokes the local software to perform automatic determining, without manual interference. In this way, it can be ensured that both the graphics processing unit and the central processing unit can run the virtual scenario at a high throughput, running pressure of the virtual scenario can also be improved, and experience of the target object in the virtual scenario can also be improved.

In actual applications, in the process of running the virtual scenario, in a real-time or polling manner, it is detected whether the graphics processing unit and the central processing unit meet the computing migration start condition, to be specific, it is detected whether a load rate (or referred to as an occupancy rate or a usage rate, referring to a ratio of a used resource (such as an internal memory or a processor) to a total resource in the graphics processing unit) of the graphics processing unit and a load rate of the central processing unit meet a computing migration condition, to facilitate determining whether to start or cancel computing migration. That the graphics processing unit and the central processing unit meet the computing migration start condition includes that the load rate of the graphics processing unit is greater than a first load threshold, and the load rate of the central processing unit is less than a second load threshold. Specific values of the first load threshold and the second load threshold may be obtained according to experience or testing. For example, a value of the first load threshold may be 90%, and a value of the second load threshold may be 50%. The specific values of the first load threshold and the second load threshold are not limited in the aspects of this disclosure.

S602: Determine, in a case of detecting that the graphics processing unit and the central processing unit meet the computing migration start condition, the target resource required by the graphics processing unit to perform resource computing during rendering the virtual scenario.

S603: Perform computing configuration on the central processing unit according to the target resource, and perform resource computing through the configured central processing unit according to the target resource, to obtain the computing result.

In step S602 and step S603, in the process of running the virtual scenario, if it is detected that the load rate of the graphics processing unit is greater than the first load threshold and the load rate of the central processing unit is less than the second load threshold, it indicates that currently the graphics processing unit takes on greater running pressure, computing efficiency of the graphics processing unit reduces, and the central processing unit is relatively idle. In this case, computing migration may be started, to reduce the running pressure of the graphics processing unit by increasing a load of the central processing unit. A part of operations after computing migration is started may include: truncating invoking of the virtual scenario related to the compute shader shown in step S602, and transferring the target resource from the graphics processing unit to the central processing unit shown in step S603. For an implementation process of step S602 and step S603, refer to related description of the implementation process of step S301 and step S302 shown in FIG. 3. Details are not described herein.

As described above in step S302 in the aspect shown in FIG. 3, the implementation process of performing computing configuration on the central processing unit according to the target resource includes: configuring the target resource from the graphics processing unit to the central processing unit, that is, to the context of the warp device of the central processing unit. What needs to be added to this step is that the target resource that needs to be configured in the context of the warp device may be located in the graphics processing unit, for example, the resource corresponding to the unordered access view or the resource corresponding to the shader resource view is located in the central processing unit, and the warp device is created in the central processing unit, that is, the warp device is located in the central processing unit. Therefore, in a computing migration process, a pipeline configuration process (that is, the foregoing process of configuring the target resource to the warp device) corresponds to a process of copying the target resource from the graphics processing unit to the central processing unit. In other words, a target resource configuration process (or referred to as the pipeline configuration process) essentially corresponds to the process of copying the target resource from the graphics processing unit to the central processing unit.

It may be understood that, resources that can be read and written by the central processing unit and the graphics processing unit are not completely the same. Therefore, the foregoing resource copying process is not simple and direct copying, but requires an intermediate data format as a transfer to implement indirect copying. An example in which the target resource belongs to a first resource type (or data type), the graphics processing unit has read-write permission for the target resource of the first resource type, and the central processing unit does not have read-write permission for the target resource of the first resource type but has read-write permission for a resource of a second resource type is used to introduce the implementation process of copying the target resource from the graphics processing unit to the central processing unit. The first resource type is different from the second resource type.

In actual applications, the graphics processing unit has the read-write permission for the target resource belonging to the first resource type, that is, the target resource includes target data (or referred to as a sub-resource), and the graphics processing unit has read-write permission for the target data included in the target resource. However, the central processing unit does not have the read-write permission for the target resource belonging to the first resource type. Therefore, the target resource belonging to the first resource type cannot be directly read by the central processing unit from the graphics processing unit. Based on this, a first reference resource that can be read by the central processing unit and that belongs to the second resource type needs to be first created in the graphics processing unit, that is, the central processing unit has read-write permission for the resource belonging to the second resource type. A size (or referred to as a resource capacity) of the created first reference resource belonging to the second resource type is the same as a size of the target resource. Then, the target data included in the target resource is first copied to the first reference resource in the graphics processing unit, to obtain an updated first reference resource, where the updated first reference resource includes the target data. Finally, because the first reference resource belongs to the second resource type and the second resource type can be read by the central processing unit, the target data can be copied from the updated first reference resource to the central processing unit.

During actual implementation, although the central processing unit has read permission for the target resource of the second resource type, an interface used by the graphics transform apparatus created in the central processing unit is still a DirectX interface (API), that is, a resource type of a resource that can be read and written by the graphics transform apparatus is still the first resource type. Based on this, a third reference resource belonging to the second resource type further needs to be created in the graphics transform apparatus (which may be context of the graphics transform apparatus). Then, the target data in the first reference resource belonging to the second resource type in the graphics processing unit is copied to the third reference resource in the graphics transform apparatus, to obtain an updated third reference resource, where the updated third reference resource includes the target data. Finally, the target data in the updated third reference resource is copied to a second reference resource, to copy the target data to the graphics transform apparatus in the central processing unit, the graphics transform apparatus itself includes the second reference resource belonging to the first resource type.

Figure 7:
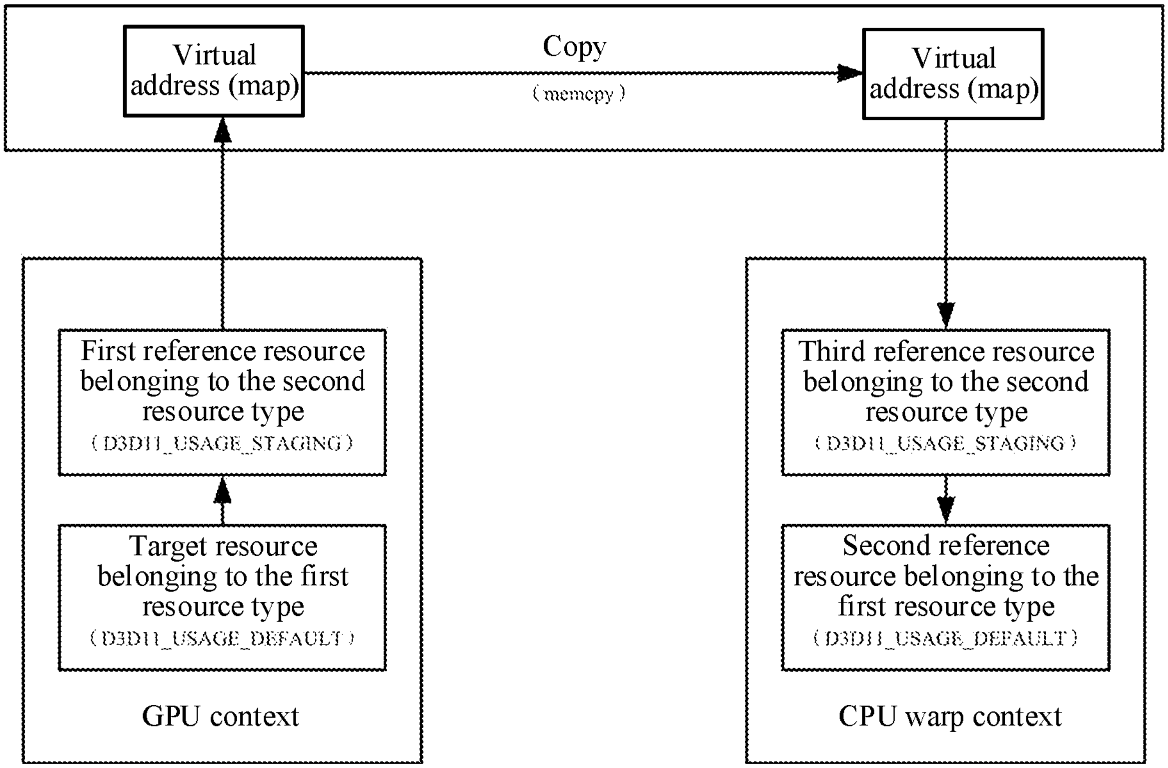
FIG. 7 is a schematic diagram of copying a texture resource from a graphics processing unit to a central processing unit according to an exemplary aspect of this disclosure.

To better understand the resource copying process described above, the resource copying process described above is illustrated below with an example. As shown in FIG. 7, by using an example in which the target resource includes a texture resource, a data format type of the texture resource used by the graphics processing unit is a D3D11_USAGE_DEFAULT type. A resource of the D3D11_USAGE_DEFAULT type can be read and written by the graphics processing unit, but cannot be read and written by the central processing unit. Therefore, when the target resource (which may be the target data included in the target resource) belonging to the D3D11_USAGE_DEFAULT type is copied from the graphics processing unit to the central processing unit, the first reference resource of the second resource type that has a same size as the target resource and that can be read and written by the central processing unit needs to be created in the graphics processing unit. For example, the second resource type that can be read and written by the central processing unit is a D3D11_USAGE_STAGING type. Then, the target data included in the target resource is first copied to the created first reference resource of the D3D11_USAGE_STAGING type. Then, the target resource is copied from the first reference resource of the D3D11_USAGE_STAGING type to the central processing unit, that is, to the warp device of the central processing unit.

Similarly, a resource type that can be read and written by the warp device is the D3D11_USAGE_DEFAULT type, that is, the warp device itself includes the second reference resource belonging to the D3D11_USAGE_DEFAULT type. However, a resource type that can be read and written by the central processing unit is the D3D11_USAGE_STAGING type. Therefore, to successfully copy the target data included in the target resource from the graphics processing unit to the context of the warp device in the central processing unit, the third reference resource belonging to the D3D11_USAGE_STAGING type further needs to be created in the context of the warp device. In this way, the target data can be copied from the third reference resource to the second reference resource, so that the warp device reads the target data from the second reference resource of the D3D11_USAGE_DEFAULT type that can be read, to perform related processing such as resource computing according to the target data.

In the foregoing process: (1) Considering that the target resource of the D3D11_USAGE_DEFAULT type may directly store a virtual address (map) to an internal memory, the target resource may be copied from a virtual address of a resource of the D3D11_USAGE_DEFAULT type in the graphics processing unit to a virtual address of a resource of the D3D11_USAGE_DEFAULT type in the central processing unit. As shown in FIG. 7, a virtual address of the target data included in the first reference resource belonging to the D3D11_USAGE_DEFAULT type is stored to internal memory space. In this case, the central processing unit may copy the virtual address of the target data from the internal memory space to the third reference resource belonging to the D3D11_USAGE_DEFAULT type in the graphics transform apparatus. In other words, by implementing copying of the target data by copying the virtual address of the target data, the target data pointed to by the virtual address can be obtained according to the virtual address.

(2) Both the first reference resource and the third reference resource that belong to the second resource type (for example, D3D11_USAGE_STAGING) involved in the foregoing copying process support resource reuse. The resource reuse may be simply understood as that, in a process of rendering a virtual picture of a virtual scenario, after the first reference resource and the third reference resource are created, when subsequent rendering of another virtual picture also requires transfer of the target resource transfer, the resource transfer may be directly performed based on the created first reference resource and third reference resource, without repeated creation. In other words, the resource (for example, the first reference resource and the third reference resource) of the D3D11_USAGE_STAGING type needs to be created only once for each resource used by the compute shader, and the created resource may be directly reused in the subsequent rendering process. In this way, a plurality of resources can be prevented from being repeatedly created in each resource copying process, so that a waste of resource creation is avoided, and a resource copying rate can be improved to a certain extent, thereby improving a rendering speed and effect of the virtual scenario.

For example, it is detected that computing migration needs to be performed during rendering a first virtual picture of the virtual scenario, that is, the target resource (for example, the texture resource) related to the first virtual picture is transferred from the graphics processing unit to the central processing unit. In this case, in a process of rendering the first virtual picture, the first reference resource belonging to the second resource type needs to be created in the graphics processing unit, and the third reference resource belonging to the second resource type needs to be created in the graphics transform apparatus, to implement transfer of the target resource. The first virtual picture is any virtual picture in the virtual scenario. Simultaneously, it is detected that computing migration also needs to be started during rendering a second virtual picture of the virtual scenario, that is, a target resource required for resource computing during rendering the second virtual picture is required to be transferred to the central processing unit for resource computing. In this case, considering that the first reference resource and the third reference resource of the target resource required by the compute shader to use are created during rendering the first virtual picture, target data included in the target resource may be directly copied to the created first reference resource in the graphics processing unit, to obtain the updated first reference resource. The second virtual picture is any virtual picture in the virtual scenario, and the second virtual picture is different from the first virtual picture. Similarly, the target data may continue to be copied from the updated first reference resource to the created third reference resource in the central processing unit. Through resource reuse of the first reference resource and the third reference resource, creation of corresponding resources can be avoided in each time of virtual picture rendering, and a migration speed can also be improved to a certain extent while creation costs are saved, thereby improving picture rendering efficiency.

(3) The resource type that can be read by the central processing unit is not limited to the foregoing D3D11_USAGE_DEFAULT type, and the resource type that can be read by the graphics processing unit is not limited to the foregoing D3D11_USAGE_STAGING type. The foregoing description exemplarily introduces the resource copying process merely by using an example of the D3D11_USAGE_DEFAULT type and the D3D11_USAGE_STAGING type, and is not intended to limit the aspects of this disclosure.

S604: Synchronize the computing result to the graphics processing unit, the computing result being configured for use by the graphics processing unit during rendering the virtual scenario.

The process of synchronizing the computing result to the graphics processing unit by using the configured central processing unit is the process of copying the computing result from the central processing unit to the graphics processing unit, where the computing result herein may include the resource corresponding to the unordered access view. Similar to the copying process of copying the target resource from the graphics processing unit to the central processing unit shown in step S603, the copying process of copying the computing result from the graphics processing unit to the central processing unit is not simple and direct copying, and also requires an intermediate data format as a transfer to implement indirect copying. To avoid repetitive descriptions, the process of copying the computing result from the central processing unit to the graphics processing unit is not described in detail in this aspect of this disclosure. For the implementation process, refer to related description of the implementation process shown in step S603.

S605: Cancel, in a process of replacing the graphics processing unit with the central processing unit to perform resource computing, resource computing performed by the central processing unit in a case of detecting that the central processing unit meets a computing migration cancellation condition.

In a process of performing any step of step S602 to step S604, that is, in the process of replacing the graphics processing unit with the central processing unit to perform resource computing after computing migration is started, if it is detected that the central processing unit meets the computing migration cancellation condition, resource computing performed by the central processing unit can be canceled. In other words, an operation of replacing the graphics processing unit with the central processing unit to perform resource computing is stopped, to ensure that a function of the central processing unit is not affected. In other words, the central processing unit in a relatively idle state is used to help the graphics processing unit to take on a part of works, but resource computing performed by the central processing unit needs to be stopped in time when the load rate of the central processing unit is high, to ensure normal working of the central processing unit. That the central processing unit meets the computing migration cancellation condition includes that the load rate of the central processing unit is greater than a third load threshold. Similar to the first load threshold and the second load threshold described above, a specific value of the third load threshold may be obtained according to experience or testing. For example, a value of the third load threshold may be 90%. The specific value of the third load threshold is not limited in the aspects of this disclosure.

In this aspect of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario. In addition, in a manner of moving a part of computing power from the graphics processing unit to the central processing unit, overheads of the graphics processing unit can be reduced by increasing overheads of the central processing unit, so that a graphics card requirement of a terminal device can be reduced in a client virtual scenario, and a proper hardware configuration (namely, a ratio of resources of the central processing unit to resources of the graphics processing unit) of a server can be achieved in a pure server virtual scenario.

The rendering processing method in the aspects of this disclosure is described in detail above. For ease of better implementing the foregoing solutions in the aspects of this disclosure, an apparatus in an aspect of this disclosure is correspondingly provided below.

Figure 8:
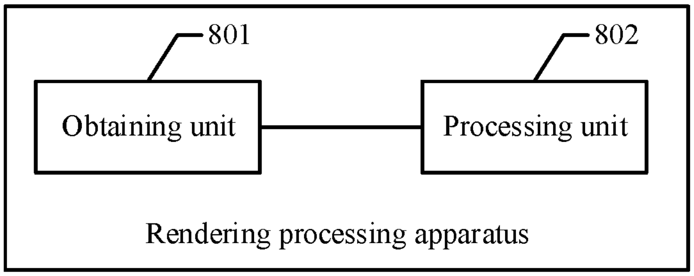
FIG. 8 is a schematic structural diagram of a rendering processing apparatus according to an exemplary aspect of this disclosure.

FIG. 8 is a schematic structural diagram of a rendering processing apparatus according to an exemplary aspect of this disclosure. The rendering processing apparatus may be a computer program (including program code) run in a computer device. The rendering processing apparatus may perform a part or all of steps of the method aspect shown in FIG. 3 or FIG. 6. Referring to FIG. 8, the rendering processing apparatus includes the following units:

an obtaining unit 801, configured to determine, in a process of rendering a virtual scenario, a target resource required by a graphics processing unit to perform resource computing during rendering the virtual scenario; and a processing unit 802, configured to perform computing configuration on a central processing unit according to the target resource, and perform resource computing through the configured central processing unit according to the target resource, to obtain a computing result, the processing unit 802 being further configured to synchronize the computing result to the graphics processing unit, the computing result being configured for use by the graphics processing unit during rendering the virtual scenario.

In an implementation, the graphics processing unit includes a first dynamic-link library file, where the first dynamic-link library file indicates to perform resource computing through the graphics processing unit during rendering the virtual scenario; and the processing unit 802 is further configured to: obtain a second dynamic-link library file, where the second dynamic-link library file indicates to perform resource computing through the central processing unit during rendering the virtual scenario;

replace the first dynamic-link library file in the graphics processing unit with the second dynamic-link library file; and invoke the second dynamic-link library file through the graphics processing unit, where the second dynamic-link library file is invoked to determine the target resource required by the graphics processing unit to perform resource computing during rendering the virtual scenario.

In an implementation, the first dynamic-link library file includes a target function, and the first dynamic-link library file invokes the target function to obtain the target resource required by the graphics processing unit to perform resource computing during rendering the virtual scenario; and the processing unit 802 is further configured to:

replace function invoking of the first dynamic-link library file for the target function with function invoking of the second dynamic-link library file for the target function, where the second dynamic-link library file invokes the target function to obtain the target resource required by the graphics processing unit to perform resource computing during rendering the virtual scenario.

In a possible implementation, the processing unit 802 is further configured to:

create a graphics transform apparatus in the central processing unit, where the graphics transform apparatus performs rendering computing by using the central processing unit; and configure the target resource in the graphics transform apparatus.

In an implementation, the target resource belongs to a first resource type, and the target resource includes target data belonging to the first resource type; the central processing unit does not have read-write permission for a resource belonging to the first resource type, and the central processing unit has read-write permission for a resource belonging to a second resource type; and the processing unit 802 is further configured to:

create a first reference resource belonging to the second resource type in the graphics processing unit, where a resource capacity of the first reference resource is the same as a resource capacity of the target resource;

copy the target data to the first reference resource in the graphics processing unit, to obtain an updated first reference resource; and copy, from the updated first reference resource, the target data to the graphics transform apparatus in the central processing unit.

In an implementation, the graphics transform apparatus includes a second reference resource belonging to the first resource type; and the processing unit 802 is further configured to:

create a third reference resource belonging to the second resource type in the graphics transform apparatus;

copy the target data in the first reference resource in the graphics processing unit to the third reference resource in the graphics transform apparatus, to obtain an updated third reference resource; and copy the target data in the updated third reference resource to the second reference resource.

In a possible implementation, the processing unit 802 is further configured to:

copy a virtual address of the target data in the first reference resource in the graphics processing unit to the third reference resource in the graphics transform apparatus.

In an implementation, in a case that during rendering a first virtual picture of the virtual scenario, the first reference resource belonging to the second resource type is created in the graphics processing unit, the third reference resource belonging to the second resource type is created in the graphics transform apparatus, and the first virtual picture is any virtual picture in the virtual scenario, the processing unit 802 is further configured to:

copy, in a case that a target resource required for resource computing during rendering a second virtual picture of the virtual scenario is required to be transferred to the central processing unit for resource computing, target data included in the target resource to the created first reference resource in the graphics processing unit, to obtain the updated first reference resource, where the second virtual picture is any virtual picture in the virtual scenario, and the second virtual picture is different from the first virtual picture; and copy, from the updated first reference resource, the target data to the created third reference resource in the central processing unit.

In an implementation, the target resource includes a resource corresponding to a target resource view, the target resource view includes at least a shader resource view and an unordered access view, and the target resource view further includes at least one of the following: a sampler view or a shader view, where the graphics transform apparatus has read permission for the shader resource view, the sampler view, and the shader view, and does not have write permission for the shader resource view, the sampler view, and the shader view; and the graphics transform apparatus has read-write permission for the unordered access view, where the read-write permission includes read permission and write permission;

the computing result includes a resource result obtained by performing computing on a resource corresponding to the unordered access view; and the processing unit 802 is further configured to:

copy the resource result from the graphics transform apparatus to the graphics processing unit.

In a possible implementation, the processing unit 802 is further configured to:

trigger, in a case of detecting that the graphics processing unit and the central processing unit meet a computing migration start condition, the step of determining a target resource required by a graphics processing unit to perform resource computing during rendering the virtual scenario, where that the graphics processing unit and the central processing unit meet a computing migration start condition includes that a load rate of the graphics processing unit is greater than a first load threshold, and a load rate of the central processing unit is less than a second load threshold; and cancel, in a process of replacing the graphics processing unit with the central processing unit to perform resource computing, resource computing performed by the central processing unit in a case of detecting that the central processing unit meets a computing migration cancellation condition, where that the central processing unit meets a computing migration cancellation condition includes that the load rate of the central processing unit is greater than a third load threshold.

In an implementation, the virtual scenario includes a virtual game scenario, a virtual shopping scenario, and an audio and video application scenario.

According to an aspect of this disclosure, the units of the rendering processing apparatus shown in FIG. 8 may be separately or wholly combined into one or several other units, or one (or more) of the units may further be divided into a plurality of units of smaller functions. In this way, same operations may be implemented, and the implementation of the technical effects of the aspects of this disclosure is not affected. The foregoing units are divided based on logical functions. In actual applications, a function of one unit may also be implemented by multiple units, or functions of multiple units are implemented by one unit. In another aspect of this disclosure, the rendering processing apparatus may also include other units. In actual applications, the functions may also be cooperatively implemented by other units and may be cooperatively implemented by a plurality of units. According to another aspect of this disclosure, a computer program (including program code) that can perform the steps in the corresponding method shown in FIG. 3 or FIG. 6 may be run on a general computing device, such as a computer, which includes processing elements and storage elements such as a central processing unit (CPU), a random access memory (RAM), and a read-only memory (ROM), to construct the rendering processing apparatus shown in FIG. 8 and implement the rendering processing method in the aspects of this disclosure. The computer program may be recorded in, for example, a computer-readable recording medium, and may be loaded into the foregoing computing device by using the computer-readable recording medium, and run on the computing device.

In this aspect of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario. In addition, in a manner of moving a part of computing power from the graphics processing unit to the central processing unit, overheads of the graphics processing unit can be reduced by increasing overheads of the central processing unit, so that a graphics card requirement of a terminal device can be reduced in a client virtual scenario, and a proper hardware configuration (namely, a ratio of resources of the central processing unit to resources of the graphics processing unit) of a server can be achieved in a pure server virtual scenario.

Figure 9:
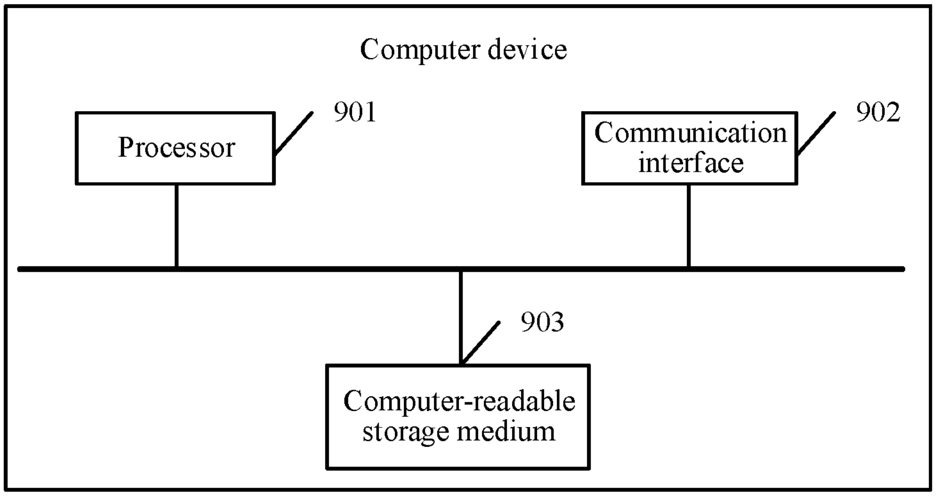
FIG. 9 is a schematic structural diagram of a computer device according to an exemplary aspect of this disclosure.

FIG. 9 is a schematic structural diagram of a computer device according to an exemplary aspect of this disclosure. Referring to FIG. 9, the computer device includes a processor 901 (e.g., processing circuitry), a communication interface 902, and a non-transitory computer-readable storage medium 903. The processor 901 and the communication interface 902 may be connected with the computer-readable storage medium 903 through a bus or other manners. The communication interface 902 is configured to send and receive data. The computer-readable storage medium 903 may be stored in a memory of the computer device. The computer-readable storage medium 903 is configured to store a computer program. The computer program includes program instructions. The processor 901 is configured to execute the program instructions stored in the computer-readable storage medium 903. The processor 901 (or referred to as a central processing unit (CPU)) is a computing core and a control core of the computer device, is adapted to implement one or more instructions, and is adapted to load and execute the one or more instructions to implement a corresponding method procedure or a corresponding function.

An aspect of this disclosure further provides a computer-readable storage medium, and the computer-readable storage medium is a memory device in a computer device and is configured to store programs and data. It may be understood that the computer-readable storage medium herein may include an internal storage medium of the computer device and certainly may also include an extended storage medium supported by the computer device. The computer-readable storage medium provides storage space, and the storage space stores an operating system of the computer device. In addition, the storage space further stores one or more instructions configured for being loaded and executed by the processor 901. The instructions may be one or more computer programs (including program code). The computer-readable storage medium herein may be a high-speed RAM memory, or a non-volatile memory, such as at least one disk memory. The computer-readable storage medium may be at least one computer-readable storage medium far away from the foregoing processor.

In an aspect, the computer device may be a target application program involved in the foregoing aspects. The computer-readable storage medium has one or more computer instructions stored therein. The processor 901 loads and executes the one or more computer instructions stored in the computer-readable storage medium, to implement corresponding steps of the aspects of the foregoing rendering processing method. In actual applications, the one or more instructions in the computer-readable storage medium are loaded by the processor 901 to perform the following steps:

determining, in a process of rendering a virtual scenario, a target resource required by a graphics processing unit to perform resource computing during rendering the virtual scenario;

performing computing configuration on a central processing unit according to the target resource, and performing resource computing through the configured central processing unit according to the target resource, to obtain a computing result; and synchronizing the computing result to the graphics processing unit, the computing result being configured for use by the graphics processing unit during rendering the virtual scenario.

In an implementation, the graphics processing unit includes a first dynamic-link library file, where the first dynamic-link library file indicates to perform resource computing through the graphics processing unit during rendering the virtual scenario; and when the determining a target resource required by a graphics processing unit to perform resource computing during rendering the virtual scenario, the one or more instructions in the computer-readable storage medium are loaded by the processor 901 to perform the following steps:

obtaining a second dynamic-link library file, where the second dynamic-link library file indicates to perform resource computing through the central processing unit during rendering the virtual scenario;

replacing the first dynamic-link library file in the graphics processing unit with the second dynamic-link library file; and invoking the second dynamic-link library file through the graphics processing unit, where the second dynamic-link library file is invoked to determine the target resource required by the graphics processing unit to perform resource computing during rendering the virtual scenario.

In an implementation, the first dynamic-link library file includes a target function, and the first dynamic-link library file invokes the target function to obtain the target resource required by the graphics processing unit to perform resource computing during rendering the virtual scenario; and when the replacing the first dynamic-link library file in the graphics processing unit with the second dynamic-link library file, the one or more instructions in the computer-readable storage medium are loaded by the processor 901 to perform the following step:

replacing function invoking of the first dynamic-link library file for the target function with function invoking of the second dynamic-link library file for the target function, where the second dynamic-link library file invokes the target function to obtain the target resource required by the graphics processing unit to perform resource computing during rendering the virtual scenario.

In an implementation, when the performing computing configuration on a central processing unit according to the target resource, the one or more instructions in the computer-readable storage medium are loaded by the processor 901 to perform the following steps:

creating a graphics transform apparatus in the central processing unit, where the graphics transform apparatus performs rendering computing by using the central processing unit; and configuring the target resource in the graphics transform apparatus.

In an implementation, the target resource belongs to a first resource type, and the target resource includes target data belonging to the first resource type; the central processing unit does not have read-write permission for a resource belonging to the first resource type, and the central processing unit has read-write permission for a resource belonging to a second resource type; and when the configuring the target resource in the graphics transform apparatus, the one or more instructions in the computer-readable storage medium are loaded by the processor 901 to perform the following steps:

creating a first reference resource belonging to the second resource type in the graphics processing unit, where a resource capacity of the first reference resource is the same as a resource capacity of the target resource;

copying the target data to the first reference resource in the graphics processing unit, to obtain an updated first reference resource; and copying, from the updated first reference resource, the target data to the graphics transform apparatus in the central processing unit.

In an implementation, the graphics transform apparatus includes a second reference resource belonging to the first resource type; and when the copying, from the updated first reference resource, the target data to the graphics transform apparatus in the central processing unit, the one or more instructions in the computer-readable storage medium are loaded by the processor 901 to perform the following steps:

creating a third reference resource belonging to the second resource type in the graphics transform apparatus;

copying the target data in the first reference resource in the graphics processing unit to the third reference resource in the graphics transform apparatus, to obtain an updated third reference resource; and copying the target data in the updated third reference resource to the second reference resource.

In an implementation, when the copying the target resource in the first reference resource in the graphics processing unit to the third reference resource in the graphics transform apparatus, to obtain an updated third reference resource, the one or more instructions in the computer-readable storage medium are loaded by the processor 901 to perform the following step:

copying a virtual address of the target data in the first reference resource in the graphics processing unit to the third reference resource in the graphics transform apparatus.

In an implementation, in a case that during rendering a first virtual picture of the virtual scenario, the first reference resource belonging to the second resource type is created in the graphics processing unit, the third reference resource belonging to the second resource type is created in the graphics transform apparatus, and the first virtual picture is any virtual picture in the virtual scenario, the one or more instructions in the computer-readable storage medium are loaded by the processor 901 to further perform the following steps:

copying, in a case that a target resource required for resource computing during rendering a second virtual picture of the virtual scenario is required to be transferred to the central processing unit for resource computing, target data included in the target resource to the created first reference resource in the graphics processing unit, to obtain the updated first reference resource, where the second virtual picture is any virtual picture in the virtual scenario, and the second virtual picture is different from the first virtual picture; and copying, from the updated first reference resource, the target data to the created third reference resource in the central processing unit.

In an implementation, the target resource includes a resource corresponding to a target resource view, the target resource view includes at least a shader resource view and an unordered access view, and the target resource view further includes at least one of the following: a sampler view or a shader view, where the graphics transform apparatus has read permission for the shader resource view, the sampler view, and the shader view, and does not have write permission for the shader resource view, the sampler view, and the shader view; and the graphics transform apparatus has read-write permission for the unordered access view, where the read-write permission includes read permission and write permission;

the computing result includes a resource result obtained by performing computing on a resource corresponding to the unordered access view; and when the synchronizing the computing result in the configured central processing unit to the graphics processing unit, the one or more instructions in the computer-readable storage medium are loaded by the processor 901 to perform the following step:

copying the resource result from the graphics transform apparatus to the graphics processing unit.

In an implementation, the one or more instructions in the computer-readable storage medium are loaded by the processor 901 to further perform the following steps:

triggering, in a case of detecting that the graphics processing unit and the central processing unit meet a computing migration start condition, the step of determining a target resource required by a graphics processing unit to perform resource computing during rendering the virtual scenario, where that the graphics processing unit and the central processing unit meet a computing migration start condition includes that a load rate of the graphics processing unit is greater than a first load threshold, and a load rate of the central processing unit is less than a second load threshold; and canceling, in a process of replacing the graphics processing unit with the central processing unit to perform resource computing, resource computing performed by the central processing unit in a case of detecting that the central processing unit meets a computing migration cancellation condition, where that the central processing unit meets a computing migration cancellation condition includes that the load rate of the central processing unit is greater than a third load threshold.

In an implementation, the virtual scenario includes a virtual game scenario, a virtual shopping scenario, and an audio and video application scenario.

In this aspect of this disclosure, first, a graphics processing unit and a central processing unit performs collaborative processing, so that running efficiency of a virtual scenario is improved, and experience of a target object in the virtual scenario is improved, without increasing a hardware cost. Then, in a process in which the graphics processing unit renders the virtual scenario, when a load rate of the graphics processing unit is high, a target resource required by a compute shader in the graphics processing unit to perform resource computing is copied to the central processing unit, so that the central processing unit replaces the graphics processing unit to perform computing on the target resource to obtain a computing result. Then, the central processing unit synchronizes the computing result to the graphics processing unit, to ensure consistency of data, to facilitate the graphics processing unit to continue to perform rendering processing of the virtual scenario based on the computing result. In this way, when the load rate of the graphics processing unit is high, the target resource is transferred to the central processing unit with a low load rate for processing. In this way, in a peak-shaving and valley-filling manner, when running pressure of the graphics processing unit is reduced, it can also be ensured that both the graphics processing unit and the central processing unit can run the virtual scenario at a high throughput, thereby further improving the running pressure of the virtual scenario, and improving the experience of the target object in the virtual scenario. In addition, in a manner of moving a part of computing power from the graphics processing unit to the central processing unit, overheads of the graphics processing unit can be reduced by increasing overheads of the central processing unit, so that a graphics card requirement of a terminal device can be reduced in a client virtual scenario, and a proper hardware configuration (namely, a ratio of resources of the central processing unit to resources of the graphics processing unit) of a server can be achieved in a pure server virtual scenario.

An aspect of this disclosure further provides a computer program product or a computer program, the computer program product or the computer program including computer-executable instructions, the computer-executable instructions being stored in a computer-readable storage medium. A processor of a computer device reads the computer-executable instructions from the computer-readable storage medium, and the processor executes the computer-executable instructions, to cause the computer device to perform the foregoing rendering processing method.

A person of ordinary skill in the art may notice that the exemplary units and algorithm steps described with reference to the aspects disclosed in this disclosure can be implemented in electronic hardware, or a combination of computer software and electronic hardware. Whether the functions are performed by hardware or software depends on particular applications and design constraints of the technical solutions. A person skilled in the art may use different methods to implement the described functions for each particular application, but it is not to be considered that the implementation goes beyond the scope of this disclosure.

All or a part of the foregoing aspects may be implemented by software, hardware, firmware, or any combination thereof. When software is used to implement the aspects, all or some of the aspects may be implemented in a form of a computer program product. The computer program product includes one or more computer instructions. When the computer program instructions are loaded and executed on a computer, the procedures or functions according to the aspects of this disclosure are all or partially generated. The computer may be a general-purpose computer, a dedicated computer, a computer network, or another programmable device. The computer instructions may be stored in a computer-readable storage medium, or transmitted by using the computer-readable storage medium. The computer instructions may be transmitted from a website, computer, server, or data center to another website, computer, server, or data center in a wired (for example, by using a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing disclosure includes some exemplary embodiments of this disclosure which are not intended to limit the scope of this disclosure. Other embodiments shall also fall within the scope of this disclosure.

What is claimed is:

1. A rendering processing method, comprising:

determining, in a process of rendering a virtual scene when a computing migration mode is engaged, a task of the rendering of the virtual scene to be directed from being performed by a graphics processing unit based on a first code library file native to the graphics processing unit to being performed by a central processing unit based on a second code library file;

determining, in the process of rendering the virtual scene, image data required by the graphics processing unit to perform the task of the rendering of the virtual scene;

configuring a rendering function for the task in the central processing unit based on the required image data and the second code library;

performing the task through the configured rendering function in the central processing unit, to obtain a computing result of the task; and outputting the computing result to the graphics processing unit, the computing result being usable by the graphics processing unit during the rendering of the virtual scene.

2. The method according to claim 1, wherein the first code library file is a first dynamic-link library file that includes instructions to perform computing through the graphics processing unit, the second code library file is a second dynamic-link library file that includes instructions to perform computing through the central processing unit, and the determining the image data includes:

obtaining the second dynamic-link library file; and invoking the second dynamic-link library file through the graphics processing unit instead of the first dynamic-link library file to determine the image data required by the graphics processing unit to perform the rendering the virtual scene.

3. The method according to claim 2, wherein the first dynamic-link library file includes a function to obtain the required image data required by the graphics processing unit to perform the task of the rendering of the virtual scene.

4. The method according to claim 1, wherein the configuring the task of the rendering function comprises:

configuring a graphics transform function in the central processing unit, wherein the graphics transform function performs rendering computing by using the central processing unit; and configuring the required image data in the graphics transform function.

5. The method according to claim 4, wherein the required image data is of a first data type;

the central processing unit does not have read-write permission for the first data type, and the central processing unit has read-write permission for a second data type; and the configuring the required image data in the graphics transform function comprises:

creating a first reference resource belonging to the second data type in the graphics processing unit, wherein a size of the first reference resource is the same as a size of the required image data;

copying the required image data to the first reference resource in the graphics processing unit, to obtain an updated first reference resource; and copying, from the updated first reference resource, the required image data to the graphics transform function in the central processing unit.

6. The method according to claim 5, wherein the graphics transform function comprises a second reference resource of the first data type; and the copying, from the updated first reference resource, the required image data to the graphics transform function in the central processing unit comprises:

creating a third reference resource of the second data type in the graphics transform function;

copying the required image data in the first reference resource in the graphics processing unit to the third reference resource in the graphics transform function, to obtain an updated third reference resource; and copying the required image data in the updated third reference resource to the second reference resource.

7. The method according to claim 6, wherein the copying the required image data in the first reference resource in the graphics processing unit to the third reference resource in the graphics transform function comprises:

copying a virtual address of the required image data in the first reference resource in the graphics processing unit to the third reference resource in the graphics transform function.

8. The method according to claim 6, wherein in a case that, during rendering a first virtual picture of the virtual scene, the first reference resource of the second data type is created in the graphics processing unit, the third reference resource of the second data type is created in the graphics transform function, and the first virtual picture is any virtual picture in the virtual scene, the method further comprises:

in a case that image data required for resource computing during rendering a second virtual picture is required to be transferred to the central processing unit for rendering computing, copying the required image data to the created first reference resource in the graphics processing unit, to obtain the updated first reference resource, wherein the second virtual picture is any virtual picture in the virtual scene, and the second virtual picture is different from the first virtual picture; and copying, from the updated first reference resource, the required image data to the created third reference resource in the central processing unit.

9. The method according to claim 4, wherein the required image data comprises at least shader image data, unordered access image data, and sampler image data, the graphics transform function has read permission for the shader image data and the sampler image data, and does not have write permission for the shader image data and the sampler image data, the graphics transform function has read-write permission for the unordered access image data, the read-write permission including read permission and write permission, the computing result is obtained by performing computing on the unordered access image data, and the outputting the computing result to the graphics processing unit includes:

copying the computing result from the graphics transform function to the graphics processing unit.

10. The method according to claim 1, wherein the method further comprises:

determining the computing migration mode is switched from being disengaged to engaged when the graphics processing unit and the central processing unit meet a computing migration start condition that includes a load rate of the graphics processing unit being greater than a first load threshold, and a load rate of the central processing unit being less than a second load threshold; and determining the computing migration mode is switched from being engaged to disengaged when the central processing unit meets a computing migration cancellation condition that includes the load rate of the central processing unit being greater than a third load threshold.

11. The method according to claim 1, wherein the virtual scene comprises a virtual game scene, a virtual shopping scene, or an audiovisual application scene.

12. A rendering processing apparatus, comprising:

processing circuitry configured to determine, in a process of rendering a virtual scene when a computing migration mode is engaged, a task of the rendering of the virtual scene to be directed from being performed by a graphics processing unit based on a first code library file native to the graphics processing unit to being performed by a central processing unit based on a second code library file;

determine, in the process of rendering the virtual scene, image data required by the graphics processing unit to perform the task of the rendering of the virtual scene;

configure a rendering function for the task in the central processing unit based on the required image data and the second code library;

perform the task through the configured rendering function in the central processing unit, to obtain a computing result of the task; and output the computing result to the graphics processing unit, the computing result being usable by the graphics processing unit during the rendering of the virtual scene.

13. The apparatus according to claim 12, wherein the first code library file is a first dynamic-link library file that includes instructions to perform computing through the graphics processing unit, the second code library file is a second dynamic-link library file that includes instructions to perform computing through the central processing unit, and the processing circuitry is further configured to:

obtain the second dynamic-link library file; and invoke the second dynamic-link library file through the graphics processing unit instead of the first dynamic-link library file to determine the image data required by the graphics processing unit to perform the rendering the virtual scene.

14. The apparatus according to claim 13, wherein the first dynamic-link library file includes a function to obtain the required image data required by the graphics processing unit to perform the task of the rendering of the virtual scene.

15. The apparatus according to claim 12, wherein the processing circuitry is further configured to:

configure a graphics transform function in the central processing unit, wherein the graphics transform function performs rendering computing by using the central processing unit; and configure the required image data in the graphics transform function.

16. The apparatus according to claim 15, wherein the required image data is of a first data type;

the central processing unit does not have read-write permission for the first data type, and the central processing unit has read-write permission for a second data type; and the processing circuitry is further configured to:

create a first reference resource belonging to the second data type in the graphics processing unit, wherein a size of the first reference resource is the same as a size of the required image data;

copy the required image data to the first reference resource in the graphics processing unit, to obtain an updated first reference resource; and copy, from the updated first reference resource, the required image data to the graphics transform function in the central processing unit.

17. The apparatus according to claim 16, wherein the graphics transform function comprises a second reference resource of the first data type; and the processing circuitry is further configured to:

create a third reference resource of the second data type in the graphics transform function;

copy the required image data in the first reference resource in the graphics processing unit to the third reference resource in the graphics transform function, to obtain an updated third reference resource; and copy the required image data in the updated third reference resource to the second reference resource.

18. The apparatus according to claim 17, wherein the processing circuitry is further configured to:

copy a virtual address of the required image data in the first reference resource in the graphics processing unit to the third reference resource in the graphics transform function.

19. The apparatus according to claim 17, wherein in a case that, during rendering a first virtual picture of the virtual scene, the first reference resource of the second data type is created in the graphics processing unit, the third reference resource of the second data type is created in the graphics transform function, and the first virtual picture is any virtual picture in the virtual scene, the processing circuitry is further configured to:

in a case that image data required for resource computing during rendering a second virtual picture is required to be transferred to the central processing unit for rendering computing, copy the required image data to the created first reference resource in the graphics processing unit, to obtain the updated first reference resource, wherein the second virtual picture is any virtual picture in the virtual scene, and the second virtual picture is different from the first virtual picture; and copy, from the updated first reference resource, the required image data to the created third reference resource in the central processing unit.

20. A non-transitory computer-readable storage medium storing computer-readable instructions thereon, which, when executed by processing circuitry, cause the processing circuitry to perform a rendering processing method comprising:

determining, in a process of rendering a virtual scene when a computing migration mode is engaged, a task of the rendering the virtual scene to be directed from being performed by a graphics processing unit based on a first code library file native to the graphics processing unit to being performed by a central processing unit based on a second code library file;

determining, in the process of rendering the virtual scene, image data required by the graphics processing unit to perform the task of the rendering of the virtual scene;

configuring a rendering function for the task in the central processing unit based on the required image data and the second code library;

performing the task through the configured rendering function in the central processing unit, to obtain a computing result of the task; and outputting the computing result to the graphics processing unit, the computing result being usable by the graphics processing unit during the rendering the virtual scene.

* * * * *